US009964655B2

(12) United States Patent
Caprioli et al.

(10) Patent No.: US 9,964,655 B2
(45) Date of Patent: May 8, 2018

(54) DEGHOSTING AFTER IMAGING

(71) Applicant: Schlumberger Technology Corporation, Sugar Land, TX (US)

(72) Inventors: Philippe Caprioli, Gatwick (GB); Robin Fletcher, Gatwick (GB); Xiang Du, Gatwick (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 262 days.

(21) Appl. No.: 14/668,012

(22) Filed: Mar. 25, 2015

(65) Prior Publication Data
US 2015/0276957 A1 Oct. 1, 2015

Related U.S. Application Data

(60) Provisional application No. 61/973,542, filed on Apr. 1, 2014.

(51) Int. Cl.
*G01V 1/38* (2006.01)
*G01V 1/36* (2006.01)
*G01V 1/28* (2006.01)

(52) U.S. Cl.
CPC ............ *G01V 1/364* (2013.01); *G01V 1/282* (2013.01); *G01V 1/38* (2013.01); *G01V 2210/20* (2013.01); *G01V 2210/51* (2013.01); *G01V 2210/56* (2013.01); *G01V 2210/74* (2013.01)

(58) Field of Classification Search
CPC .................................................. G01V 2210/56
USPC .......................................................... 367/24
See application file for complete search history.

(56) References Cited

U.S. PATENT DOCUMENTS

| 6,081,765 A | 6/2000 | Ziolkowski |
| 7,676,327 B2 | 3/2010 | Ozdemir et al. |
| 8,456,951 B2 * | 6/2013 | Soubaras ................. G01V 1/28 367/24 |
| 2005/0046612 A1 * | 3/2005 | Blunt ..................... G01S 13/284 342/195 |
| 2009/0251992 A1 | 10/2009 | Van Borselen et al. |
| 2009/0326895 A1 | 12/2009 | Berasley |

(Continued)

FOREIGN PATENT DOCUMENTS

| EP | 0400769 A2 | 12/1990 |
| EP | 2 395 374 A1 | 12/2011 |

(Continued)

OTHER PUBLICATIONS

Vasconcelos, I. and Rickett, J. 2013, Broadband extended images by joint inversion of multiple blended wavefields. Geophysics, vol. 78, No. 2 (Mar.-Apr. 2013); pp. WA147-WA158.

(Continued)

*Primary Examiner* — Ian J Lobo
(74) *Attorney, Agent, or Firm* — Michael Guthrie

(57) ABSTRACT

A technique includes determining an image of a subsurface geologic region of interest, where the image represents at least in part ghost energy that is attributable to reflections caused by a reflecting interface. The technique includes deghosting the image, which includes processing data representing the image in a processor-based machine to determine at least one impulse response of a modeling and migration of at least one point scatterer for the region and use the impulse response(s) to attenuate the ghost energy.

18 Claims, 6 Drawing Sheets

(56) References Cited

U.S. PATENT DOCUMENTS

| | | | |
|---|---|---|---|
| 2011/0292762 A1* | 12/2011 | Ozdemir | G01V 1/3808 |
| | | | 367/24 |
| 2013/0185032 A1 | 7/2013 | Archer et al. | |
| 2013/0279290 A1 | 10/2013 | Poole | |
| 2013/0308420 A1 | 11/2013 | Soubaras | |

FOREIGN PATENT DOCUMENTS

| | | |
|---|---|---|
| FR | 2955496 B1 | 7/2011 |
| FR | 14668012 B1 | 3/2015 |

OTHER PUBLICATIONS

International Search Report issued in related PCT application PCT/US2015/023577 dated Jul. 2, 2015, 3 pages.
EP Application No. 15 774 067.1, Extended European Search dated Nov. 2, 2017 (7 pages).
Joost Van Der Neut et al: "Deghosting, Demultiple, and Deblurring in Controlled-Source Seismic Interferometry", International Journal of Geophysics, vol. 75, No. 3, Jan. 1, 2011 (Jan. 1, 2011), pp. 1-28 (28 pages).

\* cited by examiner

DEGHOSTING AFTER IMAGING

This application claims the benefit under 35 U.S.C. § 119(e) to U.S. Provisional Patent Application Ser. No. 61/973,542, entitled, "DEGHOSTING AFTER IMAGING," which was filed on Apr. 1, 2014, and is hereby incorporated by reference in its entirety.

BACKGROUND

Acquired marine seismic data (and some other forms of collected data) typically contains source and receiver "ghost", which refers to energy introduced due to spurious reflections from a relatively strong reflecting interface, which in the case of acquired marine seismic data may be the free sea surface. The ghost limits the temporal resolution of the seismic wavelet, controls the roll-off of the data spectrum at low frequencies and introduces spectral notches at higher frequencies. Constructive and destructive interferences of the ghost events with the up-going wavefield introduce frequency and propagation angle dependent perturbations. Source and receiver cable depths and the dimensionality of the wavefield directly impact the ghosts; and in practice, other factors, such as acquisition noise, weather expectations and acquisition/processing capability affect the process of removing the ghosts.

Traditionally, a process to remove ghost, called "deghosting," is applied on pre-stack data and at a relatively early stage in the processing chain so that subsequent pre-migration processing takes advantage of a sharper wavelet (e.g., velocity analysis and so forth).

SUMMARY

Figure 1:
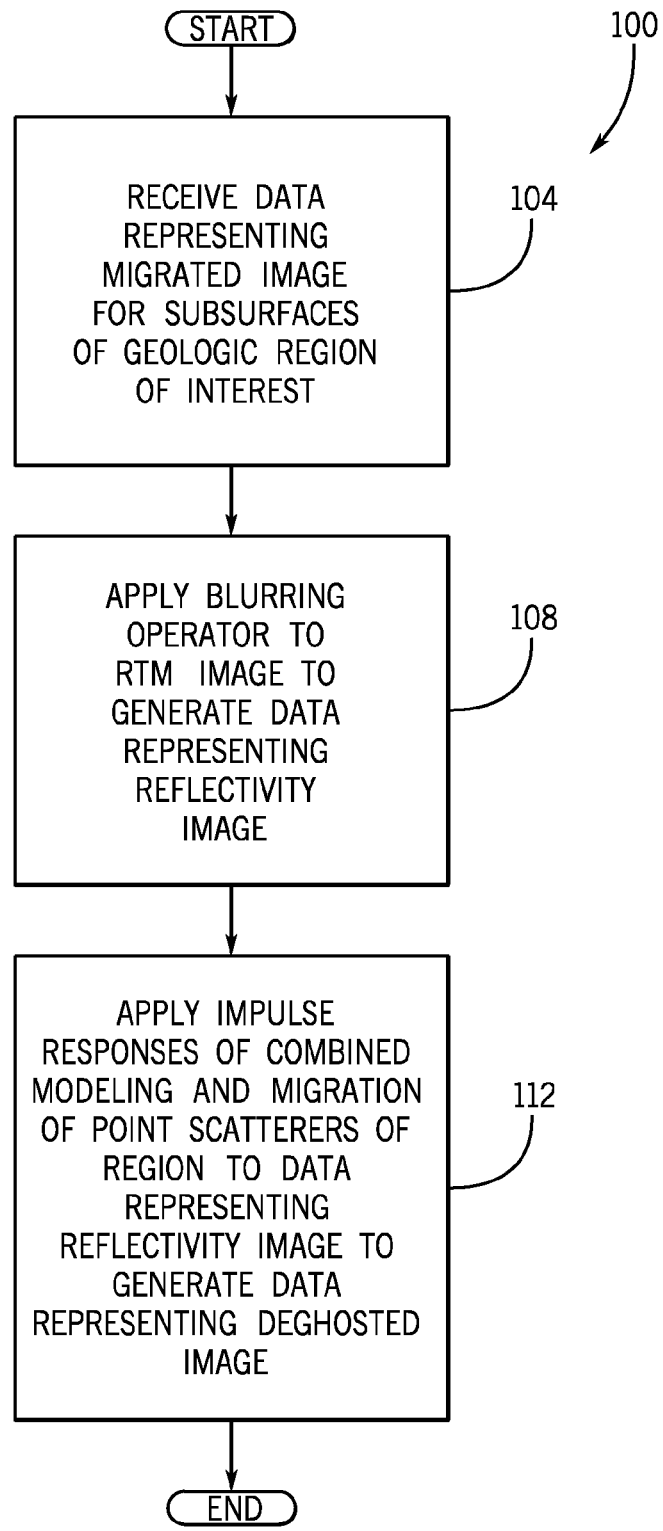
FIGS. 1 and 2 are flow diagrams depicting techniques to perform post-imaging deghosting according to example implementations.

The summary is provided to introduce a selection of concepts that are further described below in the detailed description. This summary is not intended to identify key or essential features of the claimed subject matter, nor is it intended to be used as an aid in limiting the scope of the claimed subject matter.

In accordance with an example implementation, a technique includes determining an image of a subsurface geologic region of interest, where the image represents at least in part ghost energy that is attributable to reflections caused by a reflecting interface. The technique includes deghosting the image, which includes processing data representing the image in a processor-based machine to determine at least one impulse response of a modeling and migration of at least one point scatterer for the region and use the impulse response(s) to attenuate the ghost energy.

In accordance with another example implementation, a system includes an interface to receive seismic data and a processor. The processor processes the seismic data to determine an image of a subsurface geologic region of interest, where the image represents at least in part ghost energy attributable to reflections caused by a reflecting interface; and determine at least one impulse response of a modeling and migration of at least one point scatterer for the region; and use the impulse response(s) to attenuate the ghost energy.

In accordance with another example implementation, a technique includes determining an image of a subsurface geologic region of interest, where the image represents at least in part ghost energy attributable to reflections caused by a reflecting interface; and deghosting the image. The deghosting includes processing data representing the image in a processor-based based machine to determine a first point spread function based at least in part on a first modeling and migration of at least one point scatterer for the region, where the first modeling is based at least in part on the ghost; and determine a second point spread function based at least in part on a second modeling and migration of at least one point scatterer for the region, where the second modeling is not based on the ghost; and use the first and second point spread functions to the image generate data indicative of a deghosted image.

In accordance with another example implementation, a technique includes determining an image of a multi-dimensional region of interest, where the image represents at least in part ghost energy attributable to reflections caused by a reflecting interface; and deghosting the image. The deghosting includes processing data representing the image in a processor-based machine to determine at least one impulse response of a modeling and migration of at least one point scatterer for the region; and use the impulse response(s) to attenuate the ghost energy.

In accordance with yet another example implementation, an article includes a non-transitory computer readable storage medium to store instructions that when executed by a processor-based machine cause the processor-based machine to access data representing an image of a subsurface geologic region of interest, where the image represents at least in part ghost energy attributable to reflections caused by a reflecting interface; and deghost the image by determining at least one impulse response of a modeling and migration of at least one point scatterer for the region, and using the impulse response(s) to attenuate the ghost energy.

In alternative or further example implementations, the modeling is based at least in part on a model for a mirrored source; a model for a mirrored receiver; or a model for a mirrored source and a mirrored receiver.

In alternative or further example implementations, partial deghosting is performed prior to determining the image, and the deghosting of the image is used to attenuate residual ghost energy resulting from the partial deghosting.

In alternative or further example implementations, the partial deghosting includes performing receiver side deghosting or source side deghosting.

In alternative or further example implementations, performing the partial deghosting includes performing source side designaturization.

In alternative or further example implementations, the deghosting includes source deghosting, source and receiver deghosting or receiver deghosting.

In alternative or further example implementations, the processor determines a first point spread function based at least in part on a first modeling and migration of at least one point scatterer for the region, where the first modeling is based at least in part on the ghost; and the processor determines a second point spread function based at least in part on a second modeling and migration of at least one point scatterer for the region, where the second modeling is not based on the ghost. The processor uses the first and second point spread functions to the image generate data indicative of a deghosted image.

In alternative or further example implementations, the seismic data includes particle motion and pressure data.

In alternative or further example implementations, the image is derived by migrating the seismic data.

In alternative or further example implementations, the image is derived by performing migration.

Advantages and other features will become apparent from the following drawings, description and claims.

DETAILED DESCRIPTION

Seismic data acquisition systems may be land-based, seabed-based, borehole-based and so forth, depending on the particular implementation. For example implementations discussed herein, the seismic data acquisition system is a marine-based towed seismic data acquisition system, although other seismic data acquisition systems may be used, in accordance with further implementations. For the marine-based seismic acquisition system, a survey vessel may tow one or more seismic streamers, and each of the seismic streamers may contain various seismic sensors (also called "receivers"), such as hydrophones, particle motion sensors (particle velocity sensors, particle acceleration sensors, and so forth), pressure gradient sensors, or combinations thereof. In general, the sensors acquire pressure and particle motion measurements of seismic energy that interacts with a subsurface geologic region of interest.

The seismic energy is produced by one or more seismic sources that are towed by, or coupled to, the survey vessel, in accordance with example implementations. In further example implementations, the seismic source(s) may operate independently of the survey vessel, in that the seismic source(s) may be coupled to other vessels or buoys, as just a few examples. As the seismic streamer(s) are towed behind the survey vessel, the seismic source(s) are activated, or fired, to produce acoustic signals, often referred to as "shots," which propagate down through a water column into a subsurface geologic region of interest, where the acoustic signals are reflected. The reflected acoustic signals, or pressure waves, are sensed by the seismic sensors of the streamer (s).

Because the streamer is positioned at some depth and not exactly at the air-water boundary, or free-surface, the pressure waves that are received and sensed by the seismic sensors include "upgoing" pressure waves that propagate to the sensors without reflection, as well as "downgoing" pressure waves that are produced by reflections of the pressure waves from the free surface. Due to the detection of downgoing pressure waves by the sensors, an error, called receiver side "ghost," is introduced into the data acquired by the sensors.

In addition to receiver side ghost, source side ghost may be introduced into the data acquired by the sensors. In this manner, because the seismic source is positioned at some depth and not exactly at the free-surface, the energy that emanates from the source propagates along two paths to the subsurface: along a first path directly to the subsurface; and along a second path in which the energy first reflects from the free surface and then propagates to the subsurface. Due to these different paths, a given shot by the source results in source energies that are delayed with respect to each other, thereby giving rise to an error, or ghost, in the data acquired by the sensors.

The goal of the seismic acquisition may be to build up an image of a survey area for purposes of identifying subterranean geological formations. Subsequent analysis of the representation may reveal probable locations of hydrocarbon deposits in subterranean geologic formations. Moreover, the seismic data may be processed to determine an elastic model and identify formation properties, fluid properties and the lithology of the formation. Depending on the particular implementation, portions of the analysis of the seismic data may be processed by a local data processing system on the survey vessel or may be processed by a remote seismic data processing system.

A process called migration (a depth-based migration, such as reverse time migration (RTM), for example) typically is performed to geometrically re-locate the seismic events that are sensed by the sensors to form an image of the subsurface. One way to attenuate ghost from the acquired seismic data is to process the acquired seismic data with a deghosting process prior to the migration-derived imaging.

In general, systems and techniques are disclosed herein for purposes of performing at least part of the deghosting after imaging, i.e., performing post-image deghosting. In this regard, the post-image deghosting refers to either full or residual deghosting after imaging and may have several advantages. For example, post image deghosting may have the advantage of a relatively large signal-to-noise ratio (SNR), as opposed to, for example, deghosting pre-stack data. Moreover, the knowledge of a velocity model in post image deghosting may avoid limitations in the spatial sampling, which prevents a full characterization of the three-dimensional (3-D) wavefield on a conventional marine system. Additionally, after imaging, ghost notches have already been partially filled in by any form of stacking (due to the notch diversity).

Traditional approaches to migration/inversion regard the acquired seismic data, d, as the result of a linear modeling operator, M, being applied to a reflectivity model, r: d=Mr.

The least-squares inverse to this problem may be described as follows:

$$\hat{r}=(M^*M)^{-1}M^*d, \qquad \text{Eq. 1.}$$

where "$\hat{r}$" represents an estimate of the reflectivity r; and "$M^*$" represents the adjoint of modeling and is a time or depth domain migration operator. The true model M and the migrated image I, where I=M*d, are related as set forth below:

$$I=M^*Mr=Hr. \qquad \text{Eq. 2}$$

In Eq. 2, "H" represents the Hessian operator, may be defined as H=M*M, and can be thought of as modeling followed by migration. The Hessian operator H is may be viewed as a measure of illumination that reflects the effects of velocity variation and the acquisition footprint. If the requirement that the Hessian operator H is defined by the modeling operator and the migration operator is relaxed, then the operator H for the purposes described herein may be considered as a blurring operator that blurs the true reflectivity model to give the image.

The operator H defines a multidimensional impulse response of the modeling and migration process at any scatterer point, which is also referred to as point spread function, or "PSF," herein. Use of the PSF is further disclosed in U.S. Patent Application Publication No. US 2013/0185032 entitled, "DETERMINING AN ELASTIC MODEL FOR A GEOLOGIC REGION," which published on Jul. 18, 2013, and is hereby incorporated by reference in its entirety.

In accordance with example implementations, the operator H may be approximated by a set of discrete multi-dimensional impulse response filter PSFs, and the operator $H^{-1}$ may be approximated by the inverse of the PSF filters. The deconvolution of the image with the PSF leads to an estimation of the reflectivity. The reflectivity can also be convolved with a set of PSFs to give an image. The definition of the operators is not limited to any particular migration/modeling methodology.

The ghost effects may be included in the blurring operator H (i.e., in the PSFs) and to this purpose, represents the modeling operator as described in Eq. 3 below:

$$d = Mr = (M_{sr} + M_s^r + M_r^s + M^{sr})r, \qquad \text{Eq. 3}$$

where "$M_{sr}$" relates to modeling with original source/receiver locations and the three additional modelling terms account for modeling mirrored source/receiver locations in order to include the free surface ghosts effects: original source with mirror receiver ($M_s^r$), mirrored source with original receiver ($M_r^s$) and mirrored source with mirrored receiver ($M^{sr}$). The modeling with mirrored locations, when extracting/injecting values from/into the wavefield, changes the sign of the data (mimicking a −1 reflection coefficient for the water surface; this change of sign cancels for the last modeling term). Modeling with ordinary and mirror sources could be performed directly with a dipole source. Thus, the data d described in Eq. 3 contains source and receiver ghost effects.

If, the receiver ghost is targeted for attenuation and it is assumed that the source ghost has been dealt with in some other way, the data modeling equation that is described in Eq. 3 may be reduced to the following:

$$d = (M_{sr} + M_s^r)r. \qquad \text{Eq. 4}$$

The least-squares inverse problem to determining a reflectivity estimate $\hat{r}_1$ becomes the following:

$$\hat{r}_1 = ((M_{sr} + M_s^r)^*(M_{sr} + M_s^r))^{-1}(M_{sr}^* + M_s^{r*})d = H_1^{-1}(I_{sr} + I_s^r). \qquad \text{Eq. 5}$$

As this is a strict least-squares inverse problem, the operator $H_1$ is a Hessian (and therefore a symmetric matrix). Eq. 5 amounts to performing an ordinary migration, $M_{sr}^*$, and a mirror receiver migration, $M_s^{r*}$, and then applying a deconvolution to the combined ordinary and mirror images, $I_{sr}$ and $I_s^r$.

In accordance with example implementations that are disclosed herein, PSFs may be used for purposes of performing post imaging deghosting. More specifically, referring to Eq. 3 with explicit source and receiver ghosts, an alternative to Eq. 5 is the following:

$$\hat{r}_2 = (M_{sr}^*(M_{sr} + M_s^r + M_r^s + M^{sr}))^{-1}M_{sr}^*d = H_2^{-1}I_{sr}. \qquad \text{Eq. 6}$$

This amounts to performing a standard migration, $M_{sr}^*$, and then deghosting the image $I_{sr}$ to estimate reflectivity $\hat{r}_2$, the fully deconvolved image. The operator $H_2$ is no longer of Hessian form as it is created by modeling with source and receiver ghost effects followed by ordinary migration, but it contains the necessary information required to deghost (as well compensate for dip dependent illumination effects) a standard image to estimate reflectivity. To just obtain the deghosted image (and not perform the inversion to compensate for dip dependent illumination) operator $M_{sr}^*M_{sr}$ may be applied to Eq. 6, resulting in the following:

$$I_{sr}^{deghost} = (M_{sr}^*M_{sr})H_2^{-1}I_{sr}. \qquad \text{Eq. 7}$$

It is noted that, as with imaging, deghosting post imaging honors the 3-D dimensionality of the wavefield. The operators $H_2$ and $M_{sr}^*M_{sr}$ may be approximated with at least one PSF depending on the required accuracy. The $\hat{r}_2$ reflectivity (Eq. 6) and/or the deghosted image (Eq. 7 or Eq. 11, described below) may be processed/analyzed in a number of applications, as can be appreciated by one of ordinary skill in the art. Moreover, in accordance with example implementations, the deghosted image may be used for quality control purposes, such as (as an example) for purposes of comparing the post image deghosting with one or multiple other deghosting techniques.

The approach disclosed above involves the migration of the data with ordinary acquisition source/receiver locations. Three similar schemes could have been proposed each only involving a single migration: either a migration with mirror source, or a migration with mirror receiver or a migration with mirrored source and mirrored receiver.

It may also be observed that the proposed estimator (Eq. 6) is unbiased and the least-squares estimator of the reflectivity is both unbiased. Also, both estimators of the reflectivity will have the same performance only if their respective modeling operators lie in the same subspace. Strictly speaking this is not the case as the modeling operators differ by the source/receiver locations.

As a more specific example, a post imaging deghosting method may be applied while considering, for simplicity, source ghost and not receiver ghost. However, the receiver ghost may be considered and dealt with in a similar fashion, in accordance with example implementations.

In accordance with example implementations, a seismic source may be modeled as being a single monopole point source that is located at a given depth below the sea surface, with the associated ghost effects. This model is assumed in example implementations that are described herein. However, in accordance with further example implementations, the modeling of the seismic source may be more precise and include details of the actual source array used to acquire the data. For example the modeling of the source may include the strength, the firing time and the geometry of all (or a subset of) the air-guns that constitute the actual source array; and the seismic source model also includes the associated ghost effects. For these example implementations, the source array directivity (or antenna) effects and ghost effects may both be included in the modeled data. Hence, following a similar approach, the operators ($PSF_{ghost}$) for these implementations contain the information to compensate an image for source directivity effects and ghost effects, and to estimate the reflectivity.

Thus, the systems and techniques that are described herein may be used to compensate an image for source directivity effects. Moreover, in accordance with example implementations, the system and techniques that are described herein may be used to remove the imprint on the image of the signature of the source, i.e., to perform source designaturization. Performing (full or partial) source designaturization in the image domain has the same advantages as deghosting: better signal-to-noise ratio and three-dimension (3-D) processing.

The relevant expressions for this post imaging deghosting example while considering source ghost, are set forth below:

$$d = Mr = (M_{sr} + M_r^s)r, \qquad \text{Eq. 8}$$

$$I^{ghost} = M_{sr}^*d, \qquad \text{Eq. 9}$$

$$\hat{r}_4 = (PSF_{ghost})^{-1}M_{sr}^*d, \text{ and} \qquad \text{Eq. 10}$$

$$I^{deghost} = PSF_{no\ ghost}\hat{r}_4, \qquad \text{Eq. 11}$$

where $PSF_{ghost} = M_{sr}^*(M_{sr} + M_r^s)$ and $PSF_{no\ ghost} = M_{sr}^*M_{sr}$.

For this example, the Hessian operator is approximated in Eqs. 10 and 11 with PSFs, which are evaluated at a set of discrete points within the model. Two sets of PSFs are generated without and with a source ghost: $PSF_{no\ ghost}$ and $PSF_{ghost}$, as set forth in Eqs. 10 and 11, respectively. The PSFs are also inverted in order to deconvolve the images from both illumination and source ghost effects. To obtain a deghosted image (bottom) a $PSF_{no\ ghost}$ operator is applied to the reflectivity previously obtained.

Thus, referring to FIG. 1, in accordance with example implementations, a technique 100 to perform post-image deghosting includes receiving data (block 104) representing a migrated image, such as a reverse time migration (RTM) image. In this manner, the data represents an image with ghost ($I^{ghost}$) and are generated by applying a migration operator to acquired seismic data (d), as set forth in Eq. 9 above. A blurring operator may then be applied to the migrated mage to generate data representing a reflectivity image, as described, for example, by Eq. 10 above. The technique 100 further includes applying (block 112) impulse responses of combined modeling and migration of point scatterers of the region (as set forth in Eq. 11 above, for example) to data representing the reflectivity image to generate data representing the deghosted image.

Figure 2:
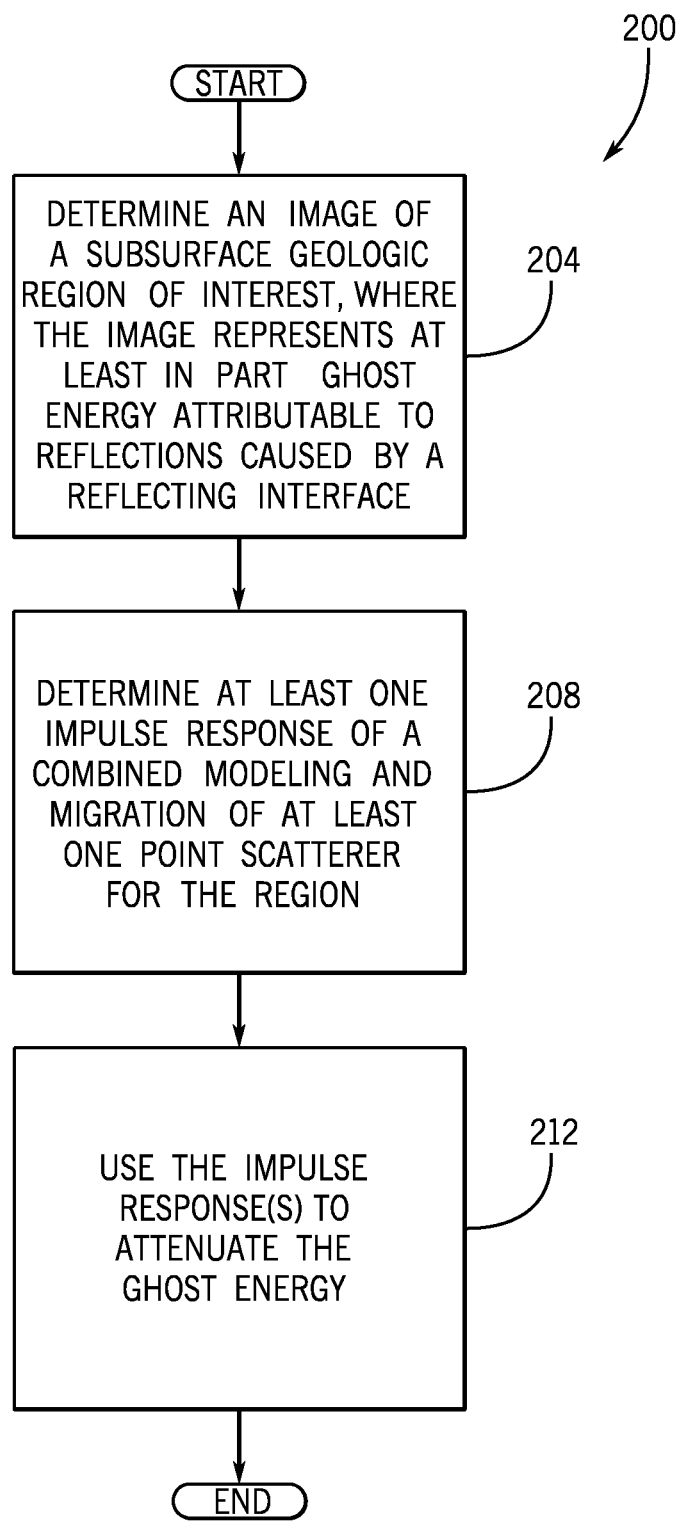

Referring to FIG. 2, to further generalize, in accordance with example implementations, a technique 200 includes determining (block 204) an image of a subsurface geologic region of interest, where the image represents at least in part ghost energy that is attributable to reflections that are caused by a reflecting interface. The technique 200 includes determining (block 208) at least one impulse response of a combined modeling and migration of at least one point scatterer for the region; and using (block 212) the impulse response(s) to attenuate the ghost energy.

In accordance with further example implementations, partial deghosting may be applied to the pre-stack data followed by a complementary deghosting post imaging. The large cross-line sampling in conventional marine acquisition may prevent the full characterization of the 3-D wavefield, and deghosting may be applied in a two-dimensional (2-D) in-line sense. If "P" denotes a partial deghosting operator that is applied to the data, Eq. 3 may be rewritten as follows:

$$Pd=PMr=P(M_{sr}+M_s^r+M_r^s+M^{sr})r=d'. \qquad \text{Eq. 12}$$

An inverse to Eq. 12 may be represented as follows:

$$\hat{r}_3=(M_{sr}*P(M_{sr}+M_s^r+M_r^s+M^{sr}))^{-1}M_{sr}*d'=H_3^{-1}I_{sr}'. \qquad \text{Eq. 13}$$

Again, this amounts to perform a standard migration to the partially deghosted data, d', and then fully deghosting the image $I_{sr}'$, to provide the reflectivity estimate, $\hat{r}_3$. The operator $H_3$ is not of Hessian form, but it captures necessary information to complement the pre-processing already applied (as well as compensate for dip dependent illumination effects). Applying $M_{sr}*M_{sr}$ to the result from Eq. 13 yields the fully deghosted image. The operators $H_3$ and $M_{sr}*M_{sr}$ can be approximated with at least one PSF (depending on the required accuracy), in accordance with example implementations.

A particle advantage in performing the partial deghosting prior to imaging is that some degree of deghosting may be applied in the data domain relatively early in the processing of the acquired seismic data in order to facilitate the subsequent processing of the data.

Figure 3:
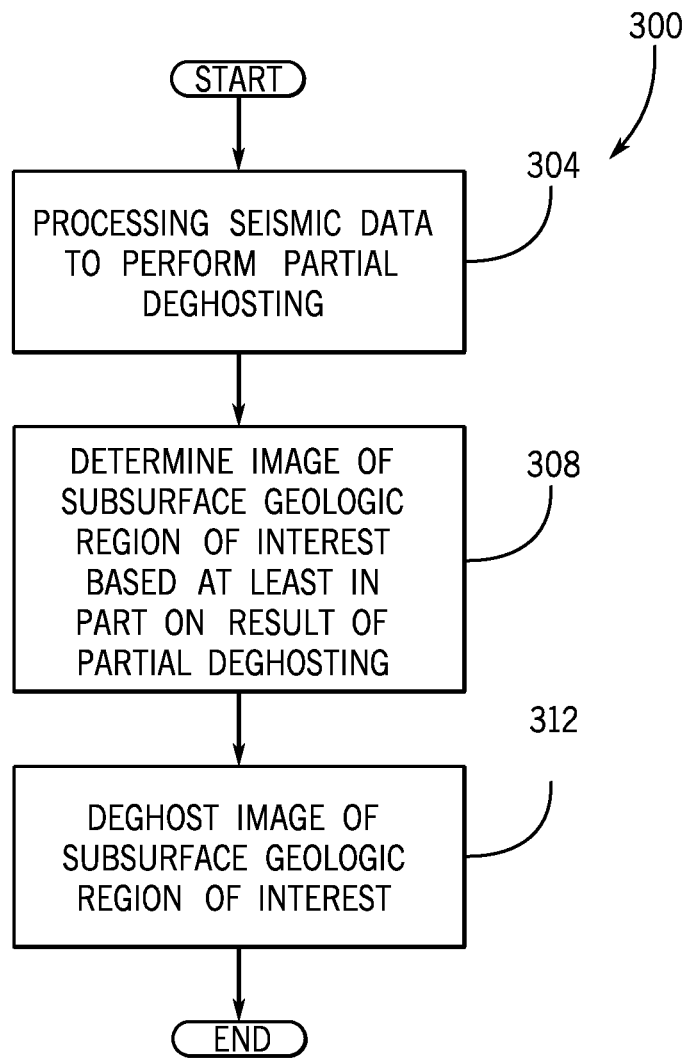
FIGS. 3, 4 and 5 are flow diagrams depicting techniques to perform partial deghosting prior to imaging and perform the remaining deghosting after imaging according to example implementations.

To summarize, referring to FIG. 3, in accordance with example implementations, a technique 300 includes processing (block 304) seismic data to perform partial deghosting and determining (block 308) an image of a subsurface geologic region of interest based at least in part on the result of the partial deghosting. The technique 300 further includes deghosting (block 312) the image of the subsurface geologic region of interest.

Figure 4:
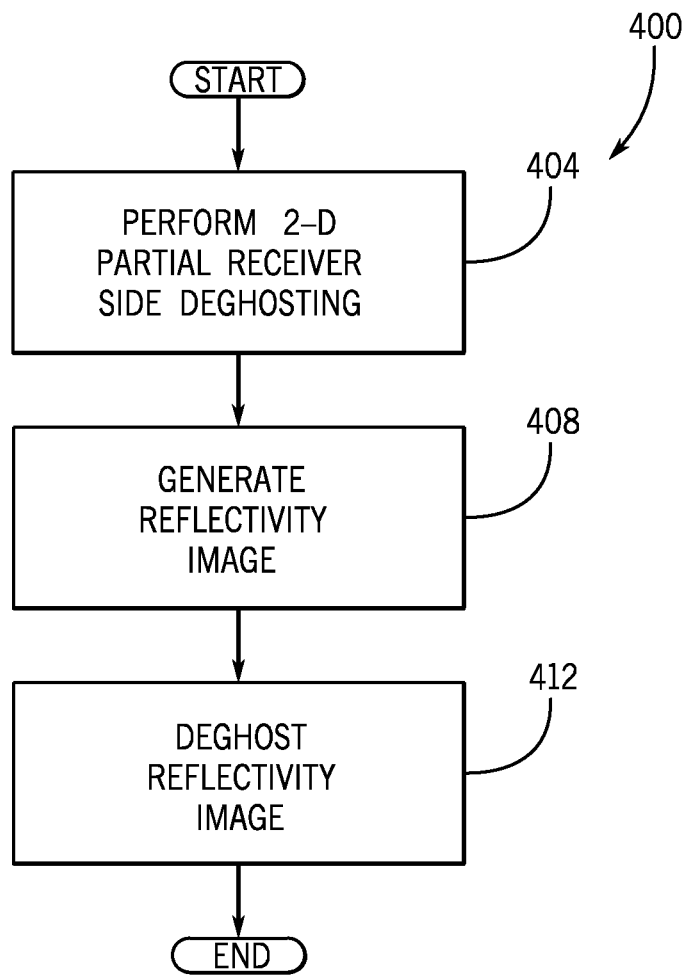

Referring to FIG. 4, as a more specific example, in accordance with some implementations, a technique 400 includes performing (block 404) 2-D partial receiver side deghosting. As an example, the 2-D partial deghosting may involve the use of a ghost model-dependent deghosting algorithm, such as the optimal deghosting (ODG) algorithm, which relies on a ghost model to minimize the influence of the streamer noise on the deghosted data. The ODG algorithm is generally described in U.S. Pat. No. 7,676,327, entitled, "METHOD FOR OPTIMAL WAVE FIELD SEPARATION," which issued on Mar. 9, 2010. As another example, the partial deghosting before imaging may involve the use of a combination of model-dependent and model-independent deghosting, as described in U.S. Patent Application Publication No. US 2011/0292762 A1, entitled, "DEGHOSTING SEISMIC DATA," which published on Dec. 1, 2011. Other 2-D techniques may be used to perform the partial receiver side deghosting, in accordance with further implementations; and a 3-D partial deghosting technique may be applied before imaging, in accordance with yet further implementations.

After the partial deghosting of the receiver side data, the technique 400 includes generating (block 408) the reflectivity image and deghosting (block 412) the reflectivity image using the techniques that are disclosed herein.

Figure 5:
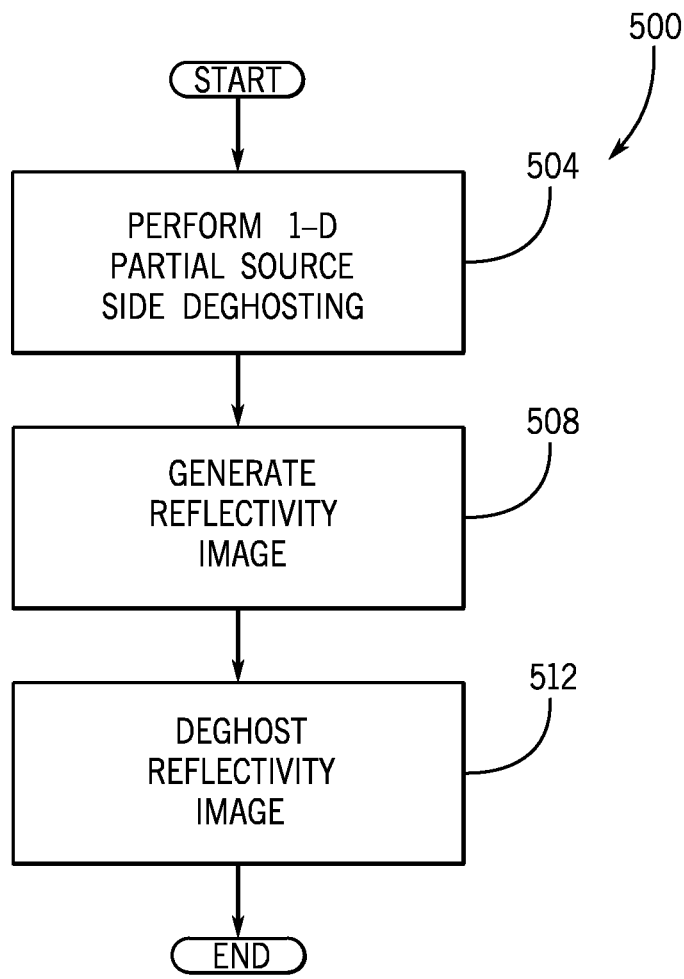

Referring to FIG. 5, as another example, in accordance with some implementations, a technique 500 includes performing (block 504) one-dimensional (1-D) partial source side deghosting of source side data. As an example, the 1-D deghosting may include applying a source deghosting correction that assumes a vertical take-off, as the dependence of the correction with the departure angles (take-off and azimuth) is ignored. The 1-D source deghosting may be part of a Calibrated Marine Source (CMS) process, which: 1. corrects for the shot-to-shot variations of the output of the seismic source; and 2. replaces the source wavelet with a user-defined wavelet or target wavelet. An example of the CMS process may be found in U.S. Pat. No. 6,081,765, entitled, "SIGNATURES OF MARINE SEISMIC SOURCES," which issued on Jun. 27, 2000. Depending on the level of noise in the data, the target wavelet may correct for all or for some of the source ghost effects. The 1-D source deghosting may also account for the phase distortion that is introduced by the ghost, while still assuming vertical take-off. After the partial source side deghosting, the technique 500 includes generating (block 508) the reflectivity image and deghosting (block 512) the reflectivity image using the techniques that are disclosed herein.

Figure 6:
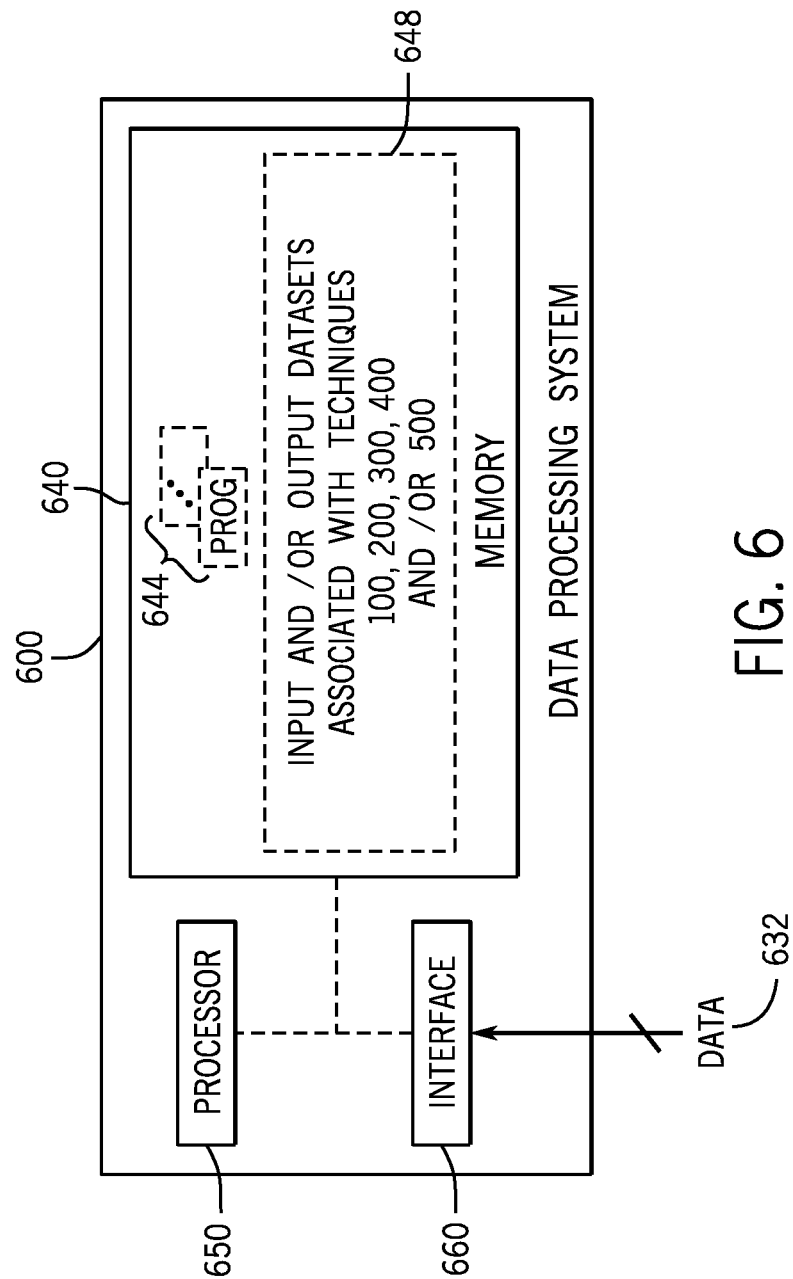
FIG. 6 is a schematic diagram of a data processing system according to an example implementation.

Referring to FIG. 6, in accordance with some implementations, a machine, such as a data processing system 600, may contain a processor 650 for purposes of processing acquired seismic data to perform deghosting, as disclosed herein. In accordance with some implementations, the processor 650 may be formed from one or more microprocessors and/or microprocessor processing cores and thus, may be itself be formed from multiple processors. In accordance with example implementations, the processor 650 may be formed from, depending on the particular implementation, one or multiple Central Processing Units (CPUs), or application specific integrated circuits (ASICs), field programmable gate arrays (FPGAs), programmable logic devices (PLDs), or other appropriate devices, as can be appreciated by one of ordinary skill in the art. As a non-limiting example, the processor 650 may be disposed on a survey vessel of a seismic acquisition system or may be disposed at a remote site, away from the survey location. Moreover, the data processing system 600 may be a distributed processing system, in accordance with further implementations, with, for example, processing components geographically disposed at different locations.

As depicted in FIG. 6, the processor 650 may be coupled to a communication interface 660 for purposes of receiving data 632, such as seismic data (particle motion data and pressure data acquired by seismic sensors, such as towed seismic sensors used in a towed marine seismic acquisition system, for example), data representing a migrated image, and so forth. As examples, the communication interface 660 may be a Universal Serial Bus (USB) interface, a network interface, a removable media interface (a flash card, CD-ROM interface, etc.) or a magnetic storage interface (an Intelligent Device Electronics (IDE)-compliant interface or Small Computer System Interface (SCSI)-compliant interface, as non-limiting examples). Thus, the communication interface 660 may take on numerous forms, depending on the particular implementation.

In accordance with example implementations, the processor 650 may be coupled to a memory 640 that stores program instructions 644, which when executed by the processor 650, may cause the processor 650 to perform various tasks of one or more of the techniques and systems that are disclosed herein, such as the techniques 100, 200, 300, 400 and 500.

As a non-limiting example, in accordance with some implementations, the instructions 644, when executed by the processor 650, may cause the processor 650 to process data representing a migrated image to perform post-image deghosting, as discussed herein. Moreover, in accordance with example implementations, the instructions 644, when executed by the processor 650, may cause the processor 650 to partially deghost seismic data before imaging, as discussed herein. The instructions 644 may or may not, when executed, cause the processor—650 to perform migration, depending on the particular implementation. In this manner, depending on the particular implementation, the data processing system 600 may, due to execution of the instructions 344, perform partial deghosting, migration and post-image deghosting; the data processing system 600 may perform migration and post-image deghosting; the data processing system 600 may receive data representing the migrated image and perform post-image deghosting; and so forth. Moreover, the data processing system 600 may solely perform post-imaging or perform other and/or different operations in addition to post-imaging, in accordance with further example implementations. Thus, may variations are contemplated, which are within the scope of the appended claims.

In general, the memory 640 is a non-transitory storage device and may take on numerous forms, such as (as non-limiting examples) semiconductor storage, magnetic storage, optical storage, phase change memory storage, capacitor-based storage, and so forth, depending on the particular implementation. Moreover, the memory 640 may be formed from more than one of these non-transitory memories, in accordance with further implementations. When executing one or more of the program instruction 644, the processor 650 may store preliminary, intermediate and/or final datasets obtained via the execution of the instructions 644 in the memory 640.

It is noted that the data processing system 600 is merely an example of one out of many possible architectures, in accordance with the techniques and systems that are disclosed herein. Moreover, the data processing system 600 is represented in a simplified form in FIG. 6, as the data processing system 600 may have various other components (a display to display initial, intermediate and/or final results of the system's processing; input devices to control the processing by the system; and so forth), as can be appreciated by the skilled artisan.

Other implementations are contemplated, which are within the scope of the appended claims. For example, in accordance with further example some embodiments, the post-image deghosting that is discussed herein may be applied to a multi-dimensional region of interest selected from the group consisting of a subterranean region, human tissue, plant tissue, animal tissue, solid volumes, substantially solid volumes, volumes of liquid, volumes of gas, volumes of plasma, and volumes of space near and/or outside the atmosphere of a planet, asteroid, comet, moon, or other body.

In some embodiments, the multi-dimensional region of interest includes one or more volume types selected from the group consisting of a subterranean region, human tissue, plant tissue, animal tissue, solid volumes, substantially solid volumes, volumes of liquid, volumes of air, volumes of plasma, and volumes of space near and/or or outside the atmosphere of a planet, asteroid, comet, moon, or other body.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a multi-dimensional space and/or subsurface region of interest may be collected and processed, e.g., medical imaging techniques such as tomography, ultrasound, MRI and the like for human tissue; radar, sonar, and LIDAR imaging techniques; mining area surveying and monitoring, oceanographic surveying and monitoring, and other appropriate multi-dimensional imaging problems.

Many examples of equations and mathematical expressions have been provided in this disclosure. But those with skill in the art will appreciate that variations of these expressions and equations, alternative forms of these expressions and equations, and related expressions and equations that can be derived from the example equations and expressions provided herein may also be successfully used to perform the methods, techniques, and workflows related to the embodiments disclosed herein.

While any discussion of or citation to related art in this disclosure may or may not include some prior art references, applicant neither concedes nor acquiesces to the position that any given reference is prior art or analogous prior art.

Those with skill in the art will appreciate that while some terms in this disclosure may refer to absolutes, e.g., all of the components of a wavefield, all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   determining an image of a subsurface geologic region of interest wherein the subsurface geologic region of interest comprises a subterranean geologic formation, and wherein the image represents at least in part ghost energy attributable to reflections caused by a reflecting interface;
   deghosting the image, the deghosting comprising processing data representing the image in a processor-based machine to:
      determine at least one impulse response of a modeling and migration of at least one point scatterer for the region of interest via approximation of a non-Hessian operator with at least one point spread function wherein application of the non-Hessian operator to the image estimates reflectivity; and
      use the at least one impulse response to attenuate the ghost energy; and
   based at least in part on the deghosting, outputting a processed image of the subterranean geologic formation.

2. The method of claim 1, wherein the modeling is based at least in part on a model for a mirrored source; a model for a mirrored receiver; or a model for a mirrored source and a mirrored receiver.

3. The method of claim 1, further comprising:
   performing partial deghosting prior to determining the image and using the deghosting of the image to attenuate residual ghost energy resulting from the partial deghosting.

4. The method of claim 3, wherein performing the partial deghosting comprises:
   performing receiver side deghosting or source side deghosting.

5. The method of claim 3, wherein performing the partial deghosting comprises:
   performing source side designaturization.

6. The method of claim 1, wherein the deghosting comprises source deghosting, source and receiver deghosting or receiver deghosting.

7. A method comprising:
   determining an image of a multi-dimensional subsurface geologic region of interest wherein the multi-dimensional subsurface geologic region of interest comprises a subterranean geologic formation, and wherein the image represents at least in part ghost energy attributable to reflections caused by a reflecting interface;
   deghosting the image, the deghosting comprising processing data representing the image in a processor-based machine to:
      determine at least one impulse response of a modeling and migration of at least one point scatterer for the region of interest via approximation of a non-Hessian operator with at least one point spread function wherein application of the non-Hessian operator to the image estimates reflectivity; and
      use the at least one impulse response to attenuate the ghost energy; and
   based at least in part on the deghosting, outputting a processed image of the subterranean geologic formation.

8. A system comprising:
   an interface to receive seismic data; and
   a processor to process the seismic data to:
      determine an image of a subsurface geologic region of interest wherein the subsurface geologic region of interest comprises a subterranean geologic formation, and wherein the image represents at least in part ghost energy attributable to reflections caused by a reflecting interface;
      determine at least one impulse response of a modeling and migration of at least one point scatterer for the region of interest via approximation of a non-Hessian operator with at least one point spread function wherein application of the non-Hessian operator to the image estimates reflectivity;
      use the at least one impulse response to attenuate the ghost energy; and
      based at least in part on attenuation of the ghost energy, outputting a processed image of the subterranean geologic formation.

9. The system of claim 8, wherein the processor determines a first point spread function based at least in part on a first modeling and migration of at least one point scatterer for the region of interest, the first modeling being based at least in part on the ghost; determines a second point spread function based at least in part on a second modeling and migration of at least one point scatterer for the region of interest, the second modeling not being based on the ghost; and uses the first and second point spread functions to the image generate data indicative of a deghosted image.

10. The system of claim 8, wherein the seismic data comprises particle motion and pressure data.

11. The system of claim 8, wherein the image comprises an image derived by migrating the seismic data.

12. The system of claim 8, wherein the processor performs partial deghosting prior to determining the image and uses the deghosting of the image to attenuate residual ghost energy resulting from the partial deghosting.

13. The system of claim 12, wherein the partial deghosting comprises source side deghosting or receiver side deghosting.

14. An article comprising a non-transitory computer readable storage medium to store instructions that when executed by a processor-based machine cause the processor-based machine to:
   access data representing an image of a subsurface geologic region of interest wherein the subsurface geologic region of interest comprises a subterranean geologic formation, and wherein the image represents at least in part ghost energy attributable to reflections caused by a reflecting interface;
   deghost the image by:
      determining at least one impulse response of a modeling and migration of at least one point scatterer for the region of interest via approximation of a non-Hessian operator with at least one point spread function wherein application of the non-Hessian operator to the image estimates reflectivity;
      using the at least one impulse response to attenuate the ghost energy; and
   based at least in part on the deghost of the image, output a processed image of the subterranean geologic formation.

15. The article of claim 14, the storage medium storing instructions that when executed by the processor-based machine cause the processor-based machine to perform partial deghosting prior to determining the image and use the deghosting of the image to attenuate residual ghost energy resulting from the partial deghosting.

16. The article of claim 15, the storage medium storing instructions that when executed by the processor-based machine cause the processor-based machine to perform receiver side deghosting and/or source side deghosting.

17. The article of claim 14, wherein the image comprises an image derived by migrating seismic data.

18. The article of claim 14, wherein the image comprises an image derived by performing migration.

* * * * *